(12) United States Patent
Struthers et al.

(10) Patent No.: US 6,648,175 B2
(45) Date of Patent: Nov. 18, 2003

(54) FUEL DISPENSER WITH NUTATING DISK METER

(75) Inventors: Kevin D. Struthers, Clayton, NC (US); Michael C. Webb, Raleigh, NC (US)

(73) Assignee: Environ Products, Inc., Smithfield, NC (US)

( * ) Notice: Subject to any disclaimer, the term of this patent is extended or adjusted under 35 U.S.C. 154(b) by 0 days.

(21) Appl. No.: 10/261,386

(22) Filed: Sep. 30, 2002

(65) Prior Publication Data

US 2003/0080145 A1 May 1, 2003

Related U.S. Application Data

(60) Provisional application No. 60/325,515, filed on Sep. 28, 2001.

(51) Int. Cl.[7] .................................................. B67D 5/16
(52) U.S. Cl. .............................. 222/71; 222/36; 73/238; 73/258
(58) Field of Search .............................. 222/71, 23, 74, 222/75, 36, 30; 141/94; 73/236, 237, 238, 239, 258, 260, 861.77

(56) References Cited

U.S. PATENT DOCUMENTS

| | | | | | |
|---|---|---|---|---|---|
| 1,858,206 | A | * | 5/1932 | Hersey | 222/36 |
| 1,922,071 | A | * | 8/1933 | Bassett | 73/232 |
| 1,974,857 | A | * | 9/1934 | Winton | 222/36 |
| 2,109,178 | A | * | 2/1938 | Marden | 73/232 |
| 2,166,531 | A | * | 7/1939 | Morgan | 73/232 |
| 2,229,915 | A | * | 1/1941 | Bystricky | 73/258 |
| 2,273,718 | A | * | 2/1942 | Morgan | 73/198 |
| 3,826,138 | A | * | 7/1974 | Rittenhouse | 73/258 |
| 3,883,042 | A | | 5/1975 | Junker | |
| 3,949,606 | A | * | 4/1976 | Blancett | 73/861.87 |
| 3,994,168 | A | * | 11/1976 | Varga | 73/258 |
| 4,253,341 | A | * | 3/1981 | Ikeda et al. | 73/861.77 |
| 4,522,237 | A | * | 6/1985 | Endo et al. | 141/95 |
| 5,251,149 | A | | 10/1993 | Williams et al. | |
| 5,261,275 | A | * | 11/1993 | Davis | 73/258 |
| 5,546,801 | A | | 8/1996 | Swinson et al. | |
| 5,630,528 | A | * | 5/1997 | Nanaji | 222/1 |
| 5,824,896 | A | * | 10/1998 | Lee | 73/238 |
| 6,474,132 | B1 | * | 11/2002 | Hathaway et al. | 73/1.27 |

* cited by examiner

Primary Examiner—Gene Mancene
Assistant Examiner—Frederick C. Nicolas
(74) Attorney, Agent, or Firm—Drinker Biddle & Reath LLP

(57) ABSTRACT

A fuel dispenser receiving fuel from a fuel source and dispenses the fuel to an output device while metering the quantity of fuel dispensed to the output device. The fuel dispenser includes a housing. A inlet port in the housing couples the housing to the fuel source. An outlet port in the housing couples the housing to the output device. A meter chamber in the housing has a chamber inlet, a chamber outlet, and a chamber opening. An inlet passage extends from the inlet port to the chamber inlet for conveying fuel received from the fuel source from the inlet port to the meter chamber. An outlet passage extends from the meter chamber outlet to the outlet port for conveying fuel from the meter chamber to the outlet port. A nutating disk meter disposed within the meter chamber of the housing is for measuring the quantity of fuel flowing through the fuel dispenser. A chamber cover covers the opening and seals the nutating disk meter in the meter chamber. The nutating disk meter includes a disk having a magnetic portion that rotates at a rate corresponding to the rate of fuel flow through the meter. A sensor disposed outside and adjacent to the meter chamber and magnetically coupled to the disk detects its rotation and generates a corresponding signal.

9 Claims, 6 Drawing Sheets

FUEL DISPENSER WITH NUTATING DISK METER

RELATED APPLICATION

This application is related to and claims priority from a U.S. Provisional Patent Application entitled Nutating Disk Meter for Petroleum Fuels, filed Sep. 28, 2001, Serial No. 60/325,515.

FIELD OF THE INVENTION

The invention is related to the field of fuel dispensers and, in particular, to a fuel dispenser having a nutating disk meter for metering the quantity of fuel dispensed by the fuel dispenser.

BACKGROUND OF THE INVENTION

Fuel dispensers (often erroneously called "fuel pumps") at service stations dispense fuel from underground tanks to customer automobiles. In addition, the fuel dispensers measure the quantity of fuel dispensed so that customers may be billed for the amount of fuel that they receive.

The quantity of liquid fuel that is dispensed is measured using a fuel meter. Modern service stations often provide up to four different products or grades of fuel on each of two sides of a fuel dispenser. Each fuel dispenser therefore includes up to eight fuel meters, one for each grade of fuel on each side of the dispenser.

The type of fuel meter commonly used in fuel dispensers for the last fifty years is a positive displacement piston-type meter. This type of meter has traditionally been used due to its ability to measure liquid flow at both low rates of flow (i.e. ½ gallon per minute) and at high rates of flow (i.e. 15 gallons per minute). Typically, each piston-type meter has its own check valve and a pair of piston-type meters share a common filter manifold for connection of a fuel filter.

Piston-type meters are complicated because they have many moving parts. This results in considerable expense to manufacture and maintain fuel dispensers that use piston-type meters. Prior to shipment from the factory, piston-type meters are tested and calibrated for liquid metering accuracy. After testing, a metal tamper-proof seal is attached to the calibration wheel to insure that it is not readjusted in the field after installation by an unqualified or unauthorized person. Officials from state government departments, typically called the "Department of Weights & Measures," periodically inspect fuel dispensers to determine their metering accuracy. These inspections are performed to insure that consumers receive the correct amount of fuel for which they have paid.

Over time and use, the internal components of a piston-type meter wear or become loose, and the level of metering accuracy drops. This progressive drop in metering accuracy is known in the industry as "meter drift." Meter drift may result in lost revenue due to an under-accounting of the quantity of dispensed fuel.

In very high volume fueling stations, it may be necessary for a certified service provider to recalibrate a piston-type meter several times a year. Many fuel dispensers will require replacement of their piston-type meters with either new or rebuilt piston-type meters over the life of the fuel dispenser. In order to repair or rebuild a conventional piston-type fuel meter it is necessary to remove the entire meter assembly from the dispenser. The plumbing lines and electrical communication lines must be disconnected to remove the piston-type meter assembly. This is a labor intensive and expensive process that causes significant down-time.

In addition, piston-type meters are large in size. A typical piston-type meter is about the size of a volley ball. A four-product dispenser with fueling on both sides would include eight positive displacement piston-type meters. To accommodate eight piston-type meters within the hydraulic cabinet of a fuel dispenser requires that the overall width of the dispenser be very large, typically over 48 inches wide. The large size of the hydraulic cabinet results in a correspondingly large fuel dispenser size, a heavy fuel dispenser, and high cost of manufacture and installation. Also, large fuel dispensers occupy a lot of space on a dispenser island at a service station and they obstruct the station attendant's view of the fueling customer and vice versa.

There is a need for an improved fuel dispenser that is smaller than conventional fuel dispensers, accurate, and simple to install and maintain.

SUMMARY OF THE INVENTION

A fuel dispenser having a nutating disk meter for measuring the quantity of fuel dispensed and a housing. The housing includes a chamber within which the nutating disk meter is removably located.

The fuel dispenser receives fuel from a fuel source and dispenses the fuel to an output device. The fuel dispenser meters the quantity of fuel dispensed to the output device. The fuel dispenser includes a housing. An inlet port of the housing is coupled to the fuel source. An outlet port of the housing is coupled to the output device. A meter chamber in the housing has a chamber inlet, a chamber outlet, and a chamber opening. An inlet passage extends from the inlet port to the chamber inlet for conveying fuel received from the fuel source from the inlet port to the meter chamber. An outlet passage extends from the chamber outlet to the outlet port for conveying fuel from the meter chamber to the outlet port. A nutating disk meter disposed within the meter chamber of the housing is used for measuring the quantity of fuel that flows through the fuel dispenser. A chamber cover covers the opening of the meter chamber and seals the nutating disk meter in the meter chamber. The nutating disk meter includes a disk having a magnetic portion that rotates at a rate corresponding to the rate of fuel flow through the meter. A sensor disposed outside and adjacent to the meter chamber is magnetically coupled to the disk for detecting its rotation and generating a corresponding signal.

BRIEF DESCRIPTION OF THE DRAWINGS

For the purpose of illustrating the invention, there is shown in the drawings a form that is presently preferred; it being understood, however, that this invention is not limited to the precise arrangements and instrumentalities shown.

DETAILED DESCRIPTION OF THE INVENTION

Figure 1:
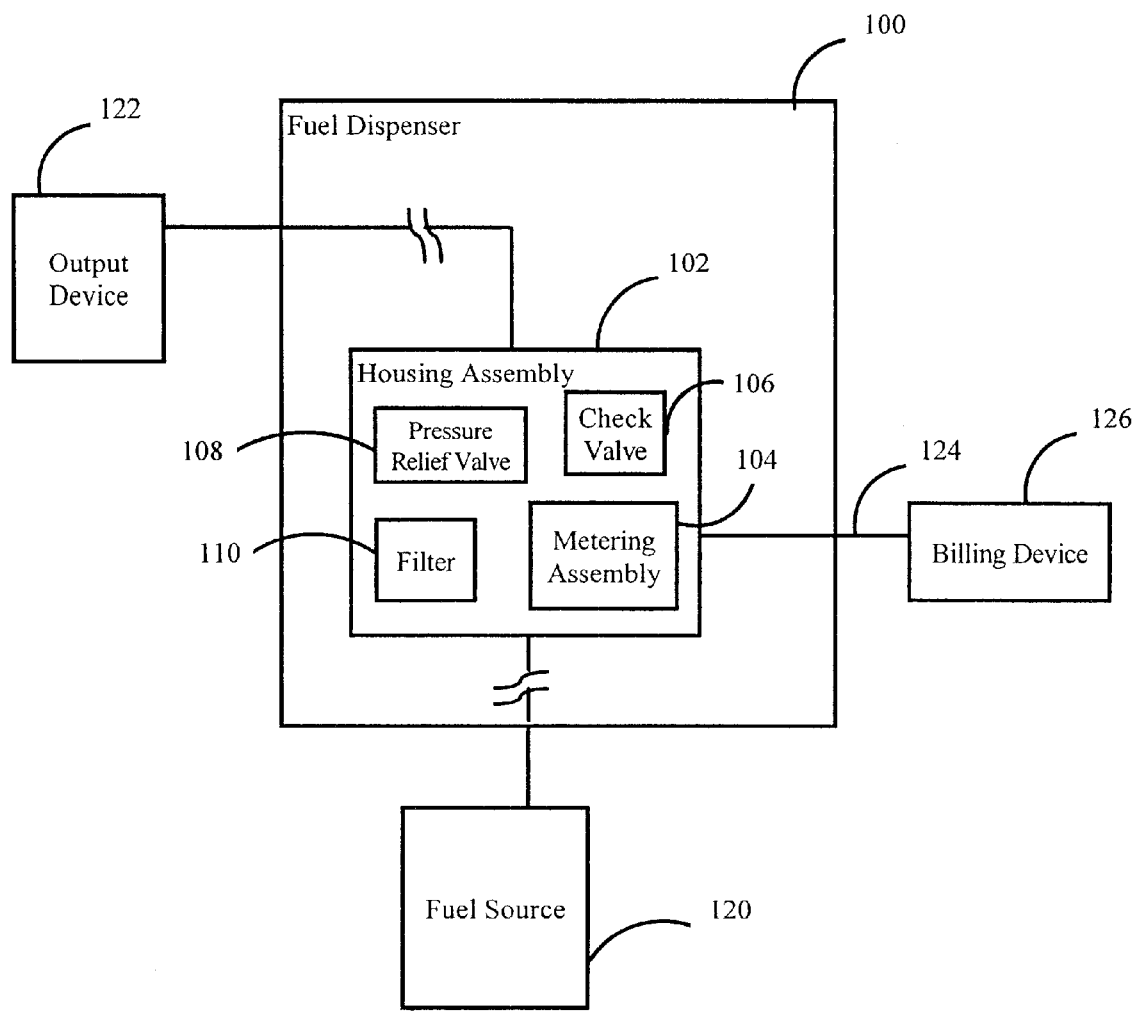
FIG. 1 is a block diagram of a fuel dispenser according to an exemplary embodiment of the present invention.

Referring to the drawings in which like reference numerals indicate like elements, there is shown in FIG. 1 a partial block diagram of fuel dispenser 100 according to the present invention. The fuel dispenser 100 receives fuel from a fuel source 120 and dispenses such fuel to an output device 122, such as an automobile.

The fuel dispenser 100 includes a housing assembly 102. The housing assembly 102 includes a housing (204 in FIG. 2A) for consolidating a meter assembly 104, a filter 100, a check value 106, and a pressure relief value 108.

The metering assembly 104 measures the quantity of fuel that flows through the housing assembly 102 and generates a signal corresponding to the quantity of, or to the flow rate of, fuel flowing through the housing assembly 102. The signal may be transmitted via a signal line 124 to a billing device 126 for charging a customer for the quantity of fuel received, for example.

The check valve 106 is arranged to allow fuel to flow in the direction from the fuel source 120 to the output device 122, and not in the opposite direction. The pressure relief valve 108 is arranged to sense pressure within the housing assembly 102 an to release such pressure if it exceeds a threshold. The filter 110 is arranged to filter fuel received from the fuel source 120 before dispensing such fuel to the output device 122.

The block diagram of FIG. 1 shows a portion of a fuel dispenser 100. Other aspects of a fuel dispenser that are not illustrated include a customer interface, means for activating/deactivating the fuel dispenser in response to payment/non-payment, etc.

Figure 2A:
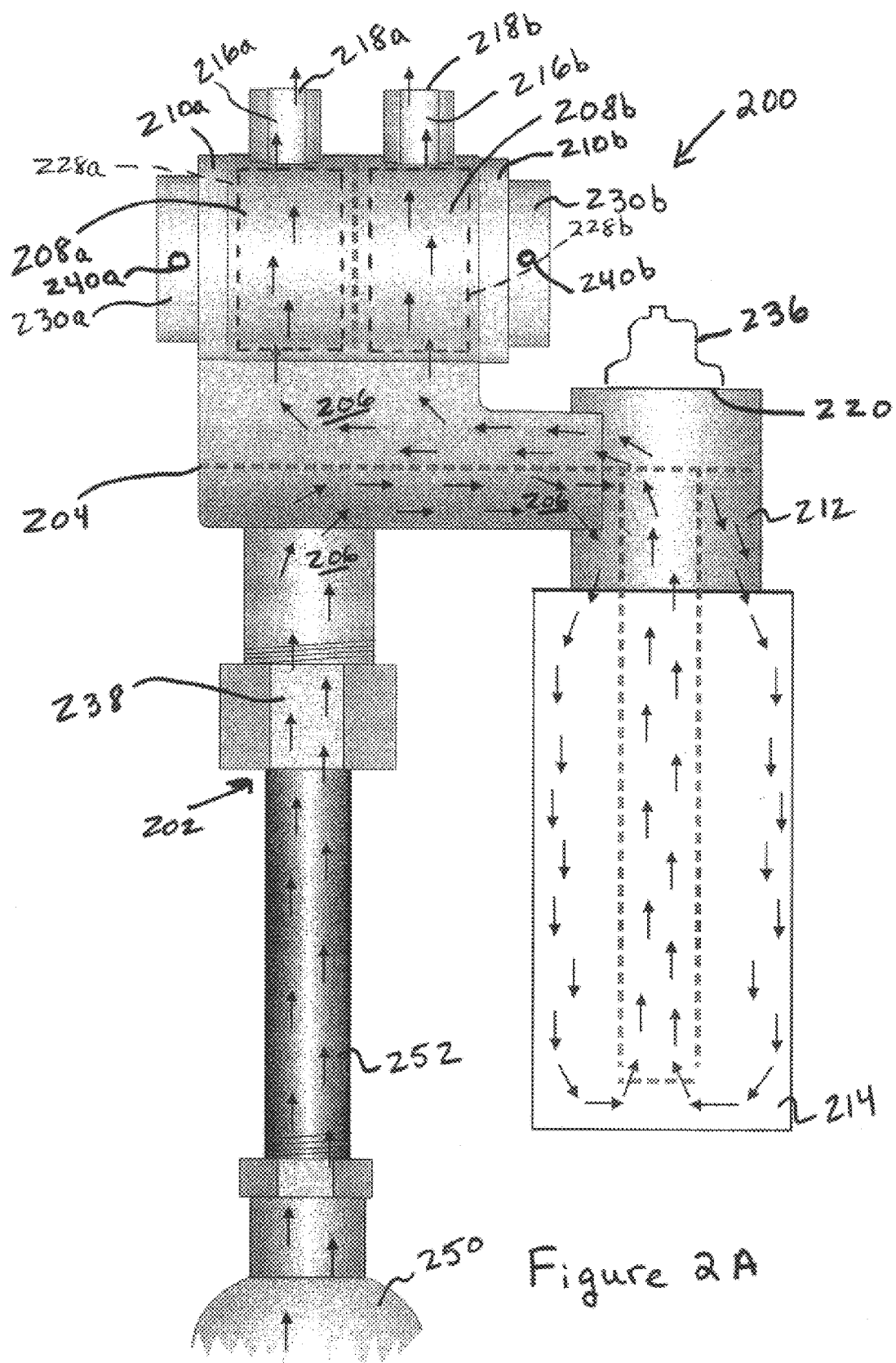
FIG. 2A is a front elevational view of a portion of a fuel dispenser according to an exemplary embodiment of the present invention.

A housing assembly 200 of a fuel dispenser according to the present invention is shown in FIG. 2A. The arrows within the housing assembly 200 designate the direction of flow of fuel through the housing assembly 200. The housing includes a single inlet port 202 for receiving fuel from a fuel source and a pair of outlet ports 218a,b for providing fuel to output devices.

In a fuel dispenser for dispensing fuel on each of its two sides, a single grade of fuel (or product) received from the fuel source at the inlet port 202 may be sourced by one outlet port 218a to an output device on one side of the fuel dispenser and by the other outlet port 218b to an output device on the other side of the fuel dispenser. Fuel may flow through none, one, or both outlet ports 218a,b depending on which side of the fuel dispenser is being used at a particular time.

Fuel from a shear valve 250 flows through a riser pipe 252 and into the inlet port 202 of the housing 204. The fuel flows through an inlet passage 206 that extends from the inlet port 202 to a filter manifold 212 portion of the housing 204. A removable fuel filter 214 or a fuel strainer device may be attached to the filter manifold 212 as shown in FIG. 2A. The filter manifold 212 directs the fuel into the fuel filter 214 and then receives the filtered fuel. A check valve access port 220 provides access to a check valve in the inlet passage 206.

Figure 2B:
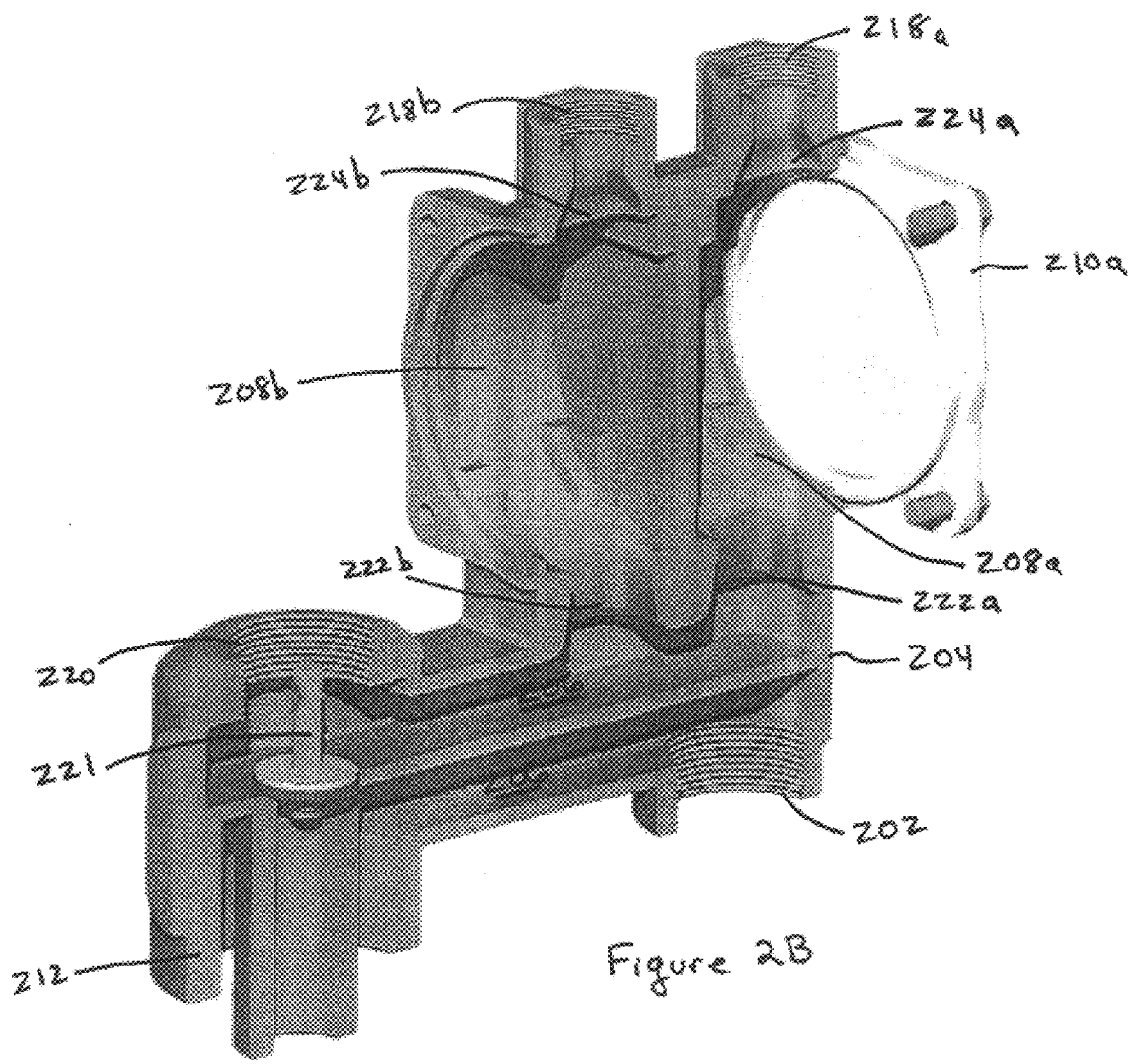
FIG. 2B is an isometric cutaway view of the housing shown in FIG. 2A with a chamber cover and a check valve.

An exemplary check valve 221 is illustrated in the inlet passage 206 in FIG. 2B. The check valve allows the fuel to flow only in the direction from the inlet port 202 toward the meter chambers 208a,b, and not in the opposite direction.

Figure 5A:
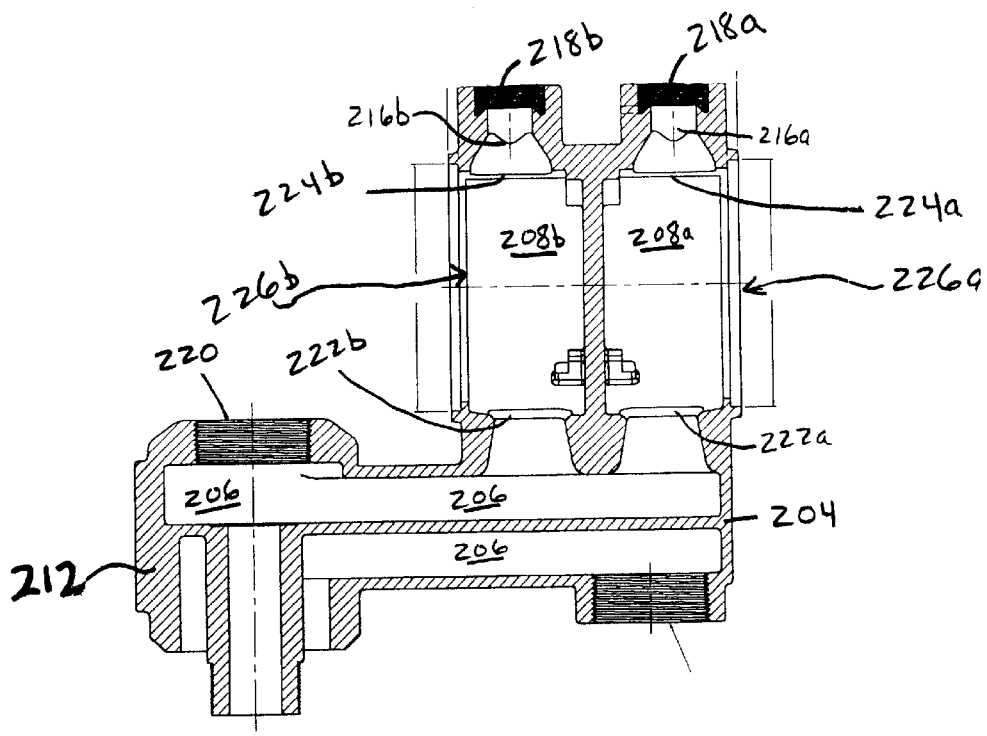
FIG. 5A is a cross-sectional view of the housing taken along line 5A—5A in FIG. 4D.
Figure 5B:
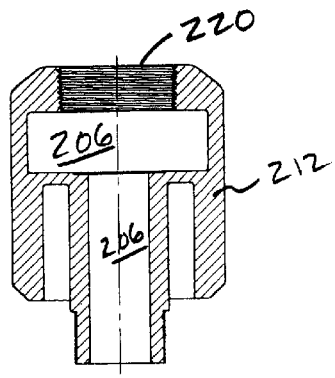
FIG. 5B is a cross-sectional view of the housing taken along line 5B—5B in FIG. 4C.
Figure 5C:
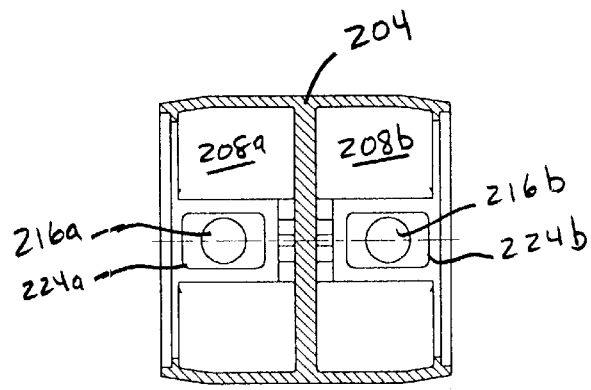
FIG. 5C is a cross-sectional view of the housing taken along line 5C—5C in FIG. 4D.

Each meter chamber 208a,b includes a chamber inlet 222a,b, a chamber outlet 224a,b, and a chamber opening 226a, b, as shown in FIG. 5A. Fuel flows from the inlet passage 206 through the chamber inlets 222a,b and into the meter chambers 208a,b. Fuel exits the meter chambers 208a,b through their respective chamber outlets 224a,b and then flows into outlet passages 216a,b that extend from the chamber outlets 224a,b to the outlet ports 218a,b.

The metering assembly 104 includes a nutating disk meter 228a,b (shown in FIG. 2A) located within each meter chamber 208a,b and its corresponding sensor assembly 230a,b. The nutating disk meters 228a,b are arranged so fuel flowing from the chamber inlets 222a,b to the chamber outlets 224a,b flows through the nutating disk meters 228a, b. Each nutating disk meter 228a,b meters the fuel flowing through its corresponding meter chamber 208a,b. Chamber covers 210a,b seal the nutating disk meters 228a,b in their respective meter chambers 208a,b.

Figure 3A:
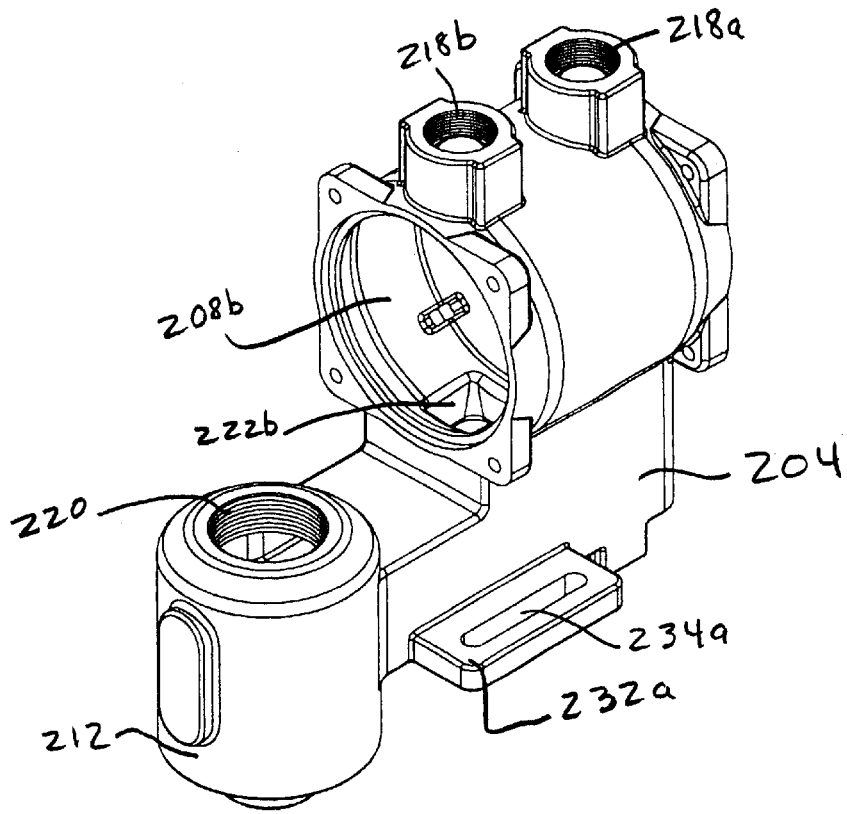
FIG. 3A is an isometric view of a housing according to the present invention.
Figure 3B:
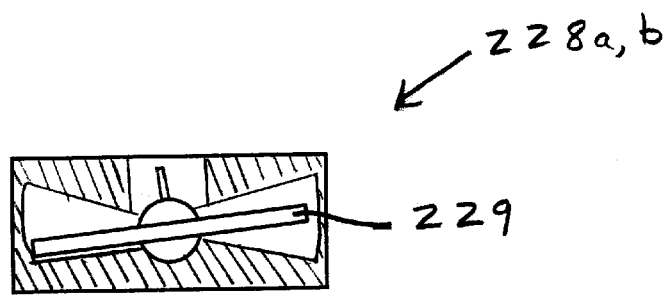
FIG. 3B is a cross-sectional view of a nutating disk meter according to the present invention.
Figure 4A:
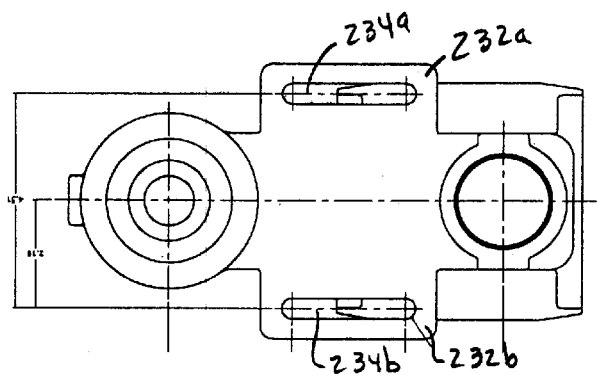
FIG. 4A is a bottom plan view of the housing shown in FIG. 3.
Figure 4B:
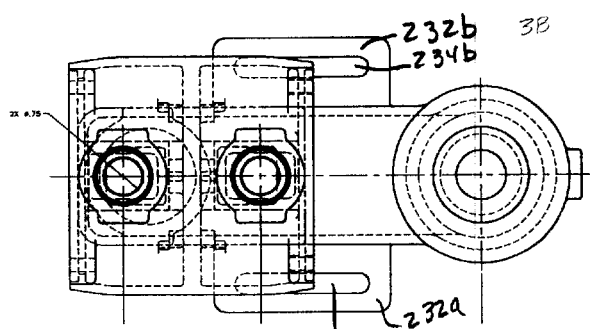
FIG. 4B is a top plan view of the housing shown in FIG. 3.
Figure 4C:
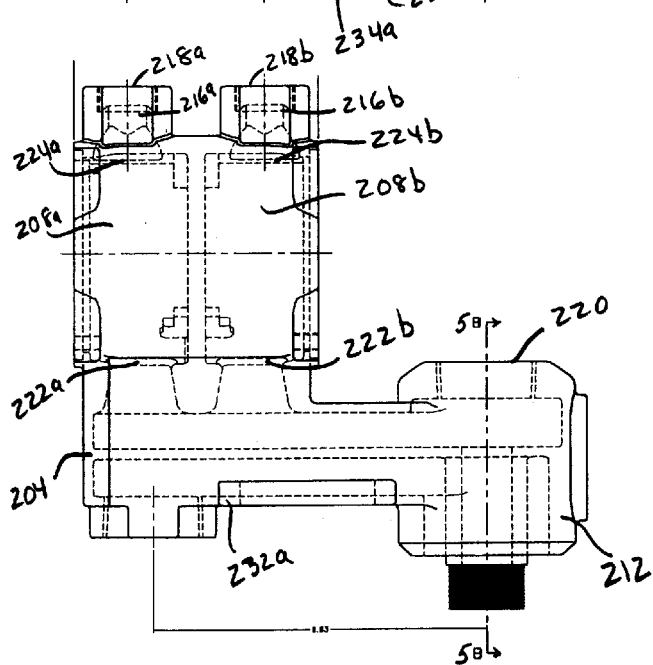
FIG. 4C is a rear elevational view of the housing shown in FIG. 3.
Figure 4D:
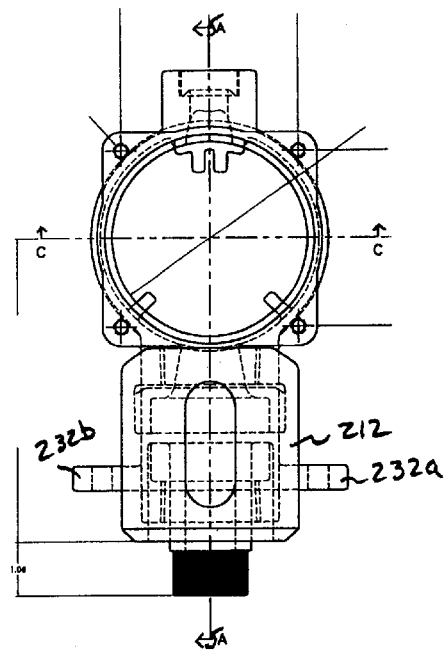
FIG. 4D is a left side elevational view of the housing shown in FIG. 3.

Each nutating disk meter 228a,b includes a nutating disk 229 as shown in FIG. 3B. The nutating disks 229 each have one or more separate magnetic portions. The nutating disks 229 of the nutating disk meters 228a,b located within the meter chambers 208a,b of the housing 204 are arranged to rotate in substantial proportion to the quantity of fuel flowing from their corresponding chamber inlet 222a,b to their chamber outlet 224a,b. The sensor assemblies 230a,b are located outside of and adjacent to their respective meter chambers 208a,b. Each sensor assembly 230a,b includes a sensor (or pulser) that is magnetically coupled to its respective disk 229 for detecting or sensing rotation of the disk 229. The sensor assembly 230a,b generates a signal corresponding to the rotation of the disk 229. The signal may be coupled to a billing device 126 via a communications opening 240a,b in the sensor assembly 230a,b.

The disks 229 have numerous magnets around their respective perimeters. The sensors sense the rotation of the disks 229 (or wheels) located inside the meter chambers 208a,b through the aluminum or non-ferrous wall of the meter chamber covers 210a,b. The more magnets there are on the perimeter of the rotating wheel, the more pulses are sensed. In such case, the sensor detects movement of multiple magnetic portions during each rotation of the disk 229. The higher the number of pulses sensed per volume of flowing fuel, the more accurate the volume measurement. In the case of the exemplary fuel dispenser and its housing 204 shown in FIGS. 1–5, the sensors can sense more than 2,000 pulses per gallon of fuel flowing through the housing 204 compared to only 1,000 pulses per gallon of conventional piston-type meters.

The housing assembly may also include a pressure relief valve 236 shown in FIG. 2A being coupled via the check valve access port 220. Alternatively, a separate port may be formed in the housing 204 for a pressure relief valve. If the pressure of fuel within the inlet passage exceeds a threshold, the pressure relief value will release the pressure.

The positioning of the sensor assemblies 230a,b external to the meter chambers 208a,b allows non-intrusive monitoring of the quantity of fluid flowing through the housing 204. This eliminates dynamic seals, such as those used to seal around rotating shafts or bearings, which can fail or leak and be a source of maintenance costs.

The position of a housing 204 within a fuel dispenser may vary depending on the physical requirements of the particular installation. For example, the location of the shear valve with respect to the position of the fuel dispenser may vary (i.e. high, low, left, right, front, back) from installation to installation, thereby affecting installation of the housing 204. The procedure to couple the housing assembly to the shear valve may therefore also vary.

The housing 204 includes adjustable (front-to-back, side-to-side and up and down) mounting features which simplify connection of the riser pipe 252 to the housing 204 and to the shear valve 250. The housing 204 includes one or more mounting flanges 232a,b having an elongated openings 234a,b that allow for side-to-side position adjustment of the housing 204. The housing 204 may similarly include mounting flanges for front-to-back position adjustment. A telescoping riser pipe inlet port 202 with a compression nut 238 allow flexible up and down positioning of the riser pipe 252 so that it may be coupled to a shear valve 250 located at various vertical (up and down) positions. These adjustable features simplify and reduce the cost of alignment and connection of the riser pipe 252 and housing 204.

Conventional piston meters, filter manifolds, check valves and pressure relief valves are typically connected together with hydraulic type tubing connectors or threaded nipples and fittings. The exemplary housing assembly 200 described above includes two meters (one per side), a telescoping riser pipe inlet, a filter manifold, a check valve, a pressure relief valve, two pulser counters (one per side), and two outlet ports (one per side). These components are incorporated or assembled into a single housing 204, formed by casting and/or machining, for example. The use of a single housing 204 eliminates numerous plumbing connection joints which are costly to install and could be a source of fuel leakage. Further, by using the common housing 204 for multiple output ports, a single check valve and a single pressure relief valve may be used for multiple output ports rather than individual check valves and pressure relief valves per outlet port.

A fuel dispenser according to the present invention has a reduced size due to nutating disk type meters generally being smaller than piston-type meters and due to the consolidation of multiple components in a single housing 204. A four-product fuel dispenser according to the present invention could include four dual-meter housings 204 for dispensing each product on both sides. The width of such a fuel dispenser is approximately 32 inches, considerably smaller, and therefore less expensive, than a conventional 48 inch dispenser.

Nutating disk meters is generally less costly to purchase, operate and maintain over their service life in comparison to piston-type meters. In addition, nutating disk meters are accurate over a wide range of flow rates and show minimal meter drift over the service life. This provides costs savings associated with reduced quantities of "unmetered fuel."

The configuration of the housing assembly 200 allows for a simple and cost-effective procedure for replacement of the nutating disk meters 228a,b in the event of wears, for example. Replacement of a nutating disk meter 228a,b may be accomplished by removing the corresponding chamber cover 210a,b from the chamber opening 226a,b; removing the nutating disk meter module 228a,b; inserting a new nutating disk meter in the meter chamber 208a,b; and then reinstalling the chamber cover 210a,b. In the event that a sensor assembly 230a,b fails, the sensor assembly 230a,b may be removed and replaced. These replacement procedures may be performed without the need to disconnect and remove the housing assembly 200 from the fuel dispenser 100. The reduces down time and repair costs because these procedures do not require disconnection of plumbing lines to replace the wearable components.

Although an exemplary fuel dispenser described above includes two nutating disk meters, a fuel dispenser may include a single meter chamber with one nutating disk meter or may include more than two meter chambers and corresponding nutating disk meters.

The foregoing describes the invention in terms of embodiments foreseen by the inventors for which an enabling description was available, although insubstantial modifications of the invention, not presently foreseen, may nonetheless represent equivalents thereto.

What is claimed is:

1. A fuel dispenser for receiving fuel from a fuel source, dispensing the fuel to an output device, and metering the quantity of fuel dispensed to the output device, the fuel dispenser comprising:
   a. a housing including:
      (i) an inlet port for coupling the housing to the fuel source,
      (ii) a first outlet port for coupling the housing to the output device,
      (iii) a first meter chamber having a chamber inlet, a chamber outlet, and a chamber opening,
      (iv) an inlet passage extending from the inlet port to the chamber inlet for conveying fuel received from the fuel source from the inlet port to the first meter chamber,
      (v) a first outlet passage extending from the first meter chamber outlet to the first outlet port for conveying fuel from the first meter chamber to the outlet port,
   b. a first nutating disk meter comprising a first disk having a magnetic portion thereof, the nutating disk meter disposed within the meter chamber of the housing and arranged to rotate when fuel flows from the chamber inlet to the chamber outlet;
   c. a first chamber cover for sealing the opening of the first meter chamber;
   d. a first sensor disposed outside and adjacent to the first meter chamber for detecting rotation of the first disk and generating a corresponding signal.

2. A fuel dispenser according to claim 1 wherein the disk comprises a plurality of separate magnetic portions thereof whereby the first sensor detects multiple pulses corresponding to each rotation of the disk.

3. A fuel dispenser according to claim 1 wherein the housing further comprises a filter manifold along the inlet passage and arranged for attachment of a fuel filter so that fuel flowing through the inlet passage flows through the fuel filter before entering the nutating disk meter.

4. A fuel dispenser according to claim 1 wherein the housing further comprises a check valve access port along the inlet passage and arranged to accept a check valve that limits the flow of fuel so that it only flows in the direction from the inlet port to the first outlet port.

5. A fuel dispenser according to claim 1 wherein the housing further comprises at least one mounting flange arranged for fixably mounting the housing in one of a plurality of positions within at least one dimension.

6. A fuel dispenser according to claim 1 further comprising a telescoping riser pipe connected to the inlet port.

7. A fuel dispenser according to claim 1 wherein the housing further comprises a pressure relief valve access port along one of the inlet passage and the first outlet passage, the pressure relief valve arranged to accept a pressure relief valve for detecting the fuel pressure within the inlet or first outlet passage, respectively.

8. A fuel dispenser according to claim 1, the housing further comprising:
   a. a second outlet port;
   b. a second meter chamber having a chamber inlet, a chamber outlet, and a chamber opening;
   c. a second outlet passage extending from the second chamber outlet to the second outlet port for conveying fuel from the second meter chamber to the second outlet port, wherein the inlet passage extends from the inlet port to the chamber inlets of the first and second meter chambers for conveying fuel from the inlet port to the first and second meter chambers, the fuel dispenser further comprising:
   a. a second nutating disk meter comprising a second disk having a magnetic portion thereof, the second nutating disk meter disposed within the second meter chamber of the housing and arranged to rotate when fuel flows from the second chamber inlet to the second chamber outlet;
   b. a second chamber cover for sealing the opening of the second meter chamber; and
   c. a second sensor disposed outside and adjacent to the second meter chamber and magnetically coupled to the second disk for detecting rotation of the second disk and generating a corresponding second signal.

9. A fuel dispenser according to claim 8 wherein the housing further comprises:
   a. a filter manifold along the inlet passage and arranged for attachment of a fuel filter so that fuel flowing through the inlet passage flows through the fuel filter before entering the nutating disk meters; and
   b. a check valve access port along the inlet passage and arranged to accept a check valve that limits the flow of fuel so that it only flows in the direction from the inlet port to the meter chambers.

* * * * *